United States Patent [19]

Leep et al.

[11] 4,362,838

[45] Dec. 7, 1982

[54] SOLVENT RESIN EMULSION GLOSS COATING COMPOSITION

[75] Inventors: Gus W. Leep, Elgin; Gary L. Bolt, Malta, both of Ill.

[73] Assignee: Seymour of Sycamore, Inc., Sycamore, Ill.

[21] Appl. No.: 272,508

[22] Filed: Jun. 11, 1981

[51] Int. Cl.³ .................... C08L 57/00; C08L 67/06
[52] U.S. Cl. ..................... 524/444; 524/315; 524/318; 524/364; 524/378; 524/389; 524/475; 524/539; 524/577; 524/601; 524/903
[58] Field of Search .............. 406/311; 260/29.2 EP, 260/235, 29.2 M, 29.6 WQ, 29.6 PM, 29.6 MM, 22 A, 18 TN, 22 CB; 524/475, 444, 903, 315, 318, 364, 378, 389, 539, 577, 601

[56] References Cited

U.S. PATENT DOCUMENTS

| | | | |
|---|---|---|---|
| 2,921,041 | 1/1960 | Francis | 260/23.3 |
| 3,474,057 | 10/1969 | DeVries | 260/23.3 |
| 3,484,260 | 12/1969 | Emslie et al. | 260/29.6 MM |
| 3,928,667 | 12/1975 | Carlos et al. | 260/29.6 ME |
| 3,997,492 | 12/1976 | Kane et al. | 260/29.6 MH |
| 3,998,775 | 12/1976 | Taub | 260/29.6 MN |
| 4,014,841 | 3/1977 | Taub | 260/29.6 MH |
| 4,070,510 | 1/1978 | Kahn | 427/385 R |
| 4,071,645 | 1/1978 | Kahn | 427/340 |
| 4,123,404 | 10/1978 | Lasher | 260/29.4 R |
| 4,147,681 | 4/1979 | Lim et al. | 260/29.6 WQ |
| 4,177,177 | 12/1979 | Vanderhoff et al. | 260/29.6 MN |
| 4,179,440 | 12/1979 | Martinez | 260/29.2 EP |
| 4,187,204 | 2/1980 | Howard | 260/29.2 EP |
| 4,252,706 | 2/1981 | Phillips et al. | 260/29.6 PM |
| 4,265,797 | 5/1981 | Suk | 260/29.6 E |

*Primary Examiner*—Ronald W. Griffin
*Attorney, Agent, or Firm*—Trexler, Bushnell & Wolters, Ltd.

[57] ABSTRACT

There is disclosed a high gloss sag resistant water-in-oil emulsion coating composition having water dispersed in an organic solvent soluble resin and a solvent blend having a boiling range and a progression of boiling points which allow a high gloss, sag-free coating to be formed from a water containing paint. The composition may include colloidal hydrated aluminum silicate to further assist in the evaporation of the dispersed water in the formation of the high gloss film.

17 Claims, No Drawings

SOLVENT RESIN EMULSION GLOSS COATING COMPOSITION

BACKGROUND OF THE INVENTION

The present invention relates generally to emulsion coating compositions and specifically to a high gloss, sag resistant solvent resin paint or varnish having water dispersed therein.

It has heretofore been difficult to provide quick drying water-in-oil emulsion solvent resin compositions which yield a high gloss coating. These compositions include water as part of the evaporative vehicle and comprise a dispersion, through the use of suitable emulsifiers, of up to 80% by weight of water in a solution of organic solvents and a solvent soluble film-forming resin. The substitution of a large portion of dispersed water for part of the evaporative vehicle in such compositions is not without problems where a high gloss, quick setting coating is desired.

In order to provide a paint or varnish that may be used on a non-horizontal surface, it is imperative that the composition set or thicken quickly to avoid the rippled surface which will result from the sagging or flowing of the coating. However, the use of only low boiling point solvents to accomplish this end has invariably resulted in a dull or hazy finish on the workpiece. In addition, the dispersed water may coalesce into larger droplets which, upon evaporation, leave unsightly blemishes on the film surface.

Thus, it has been impossible to compound a water-in-oil solvent resin coating emulsion which will afford the quick set necessary for sag resistance as well as a smooth, high gloss finish. These qualities are important in all finishes, but are especially desired in compositions to be dispensed from pressurized containers, commonly known as aerosol spray finishes.

These problems result from the inclusion of water as the dispersed phase of the emulsion. Standard non-emulsion aerosol or quick setting paint has a high percentage of low boiling point solvents i.e. 70% to 80% by weight of the solvent having a boiling point of from 100° to 200° F. This allows a quick set of the finish. When a high percentage of low boiling solvents is used in a water-in-oil emulsion composition, the water does not evaporate before the film closes and is trapped, in microscopic droplets, within the coating.

This contributes to a dull finish in several ways. First, the trapped bulk water causes precipitation of insoluble resin compounds which forms a haze in clear coatings. Also, a uniform dull finish will be formed if the water droplets penetrate the partially set film to evaporate and the coating lacks the resiliency to close the resultant surface imperfections. In addition, thicker film coatings, such as occur at the edge of sprayed workpieces, produce wide variations in gloss due to the increased time required for the evaporation of the water from those areas.

Also, the dispersed water droplets may tend to coalesce to form larger droplets which, while not noticeably affecting a non-gloss coating, cause unsightly blemishes and otherwise affect the gloss of the paint or varnish.

As used herein, the term quick setting defines a rapid partial formation or thickening of the film which is sufficient to arrest flowing or sagging of the newly applied coating. Quick drying relates to the time necessary to produce a tack free film on a substrate. The compositions of the present invention may have varying drying or curing rates dependent on the resins employed. Generally, a paint or varnish composition having a setting time in excess of five minutes will have a marked tendency to flow and sag.

SUMMARY OF THE INVENTION

Therefore, a primary object of the invention is to provide a high gloss water-in-oil solvent resin paint or varnish composition.

A further object of the invention is to provide a high gloss, quick set water-in-oil emulsion solvent resin paint or varnish composition which is sag resistant.

A still further object of the invention is to provide an aerosol sprayable water-in-oil solvent resin coating composition which will produce a gloss, sag resistant, quick drying film.

The present emulsion composition cures to produce a sag-free, high gloss coating through the use of selected organic solvents having boiling points which allow the evaporation of the coating vehicle at a rate which allows a quick setting of the resin film to avoid sagging, and complete evaporation of the dispersed water. The invention further includes the addition of colloidal hydrated aluminum silicate, or derivatives thereof, to paints including relatively non-polar pigments in order to prevent the coalescence of the dispersed water of the emulsion. Thus, the water evaporates from the wet coating without disrupting the normal formation of a high gloss film.

Useful resins which may be used are the organic solvent soluble resins traditionally used to produce gloss paint and varnish compositions, including vinyl toluene modified alkyd resins, acrylic modified alkyd resins, styrene modified alkyd resins, aromatic hydrocarbon resins, acrylic/vinyl toluene modified alkyd resins and styrene/vinyl toluene modified alkyd resins.

According to the present invention, a single emulsifier having an HLB of from two to about six may be used. However, it is preferable to use a blend of emulsifiers, including a continuous phase component as well as an emulsifier for the dispersed phase, which produce an emulsifier system having an HLB of from two to about six. When two or more of these emulsifiers are to be blended the HLB of the combination is calculated by the formula $xA + (1-x)B$ wherein x is the percent proportion of the emulsifier having an HLB of A and B is the HLB of the second emulsifier. It has been found that the most stable emulsion systems consist of blends of two or more emulsifiers, one portion having lipophilic tendencies (HLB 0.5 to 5.0), and the other portion having hydrophilic tendencies (HLB 5.0 to 12.0).

Other objects and advantages will become apparent upon a review of the following detailed description and the appended claims.

DESCRIPTION OF THE PREFERRED EMBODIMENT

The percentages expressed herein, both in the specification and the claims appended thereto, are intended and expressed as percentages by weight of the total composition to which they refer. A black enamel was prepared having the following compositions:

| | |
|---|---|
| Carbon black | 1.1% |
| Vinyl toluene modified alkyd resin | 15.2% |
| Organic solvents, not more than | |

| | |
|---|---|
| 20% boiling higher than 200° F. | 52.7% |
| Pigment dispersants, anti-settling agents, mar resistance agents and drier catalysts | 0.6% |
| Emulsifiers (Sorbitan trioleate and polyethylene glycol monooleate) | 0.4% |
| Water | 30.0% |
| | 100.0% |

This composition, whether brushed or combined with propane or propane/butane/isobutane propellants and applied from an aerosol container, dried to a hazy, low gloss finish due to the fact that the dispersed water could not escape before the film closed. Enamels produced in this manner produced a very low gloss, in the range of 10 to 30 when measured on a 60 degree gloss meter, the standard instrument in the paint industry.

A second composition was produced having a similar composition, but having solvents which boiled between 350° and 400° F. This enamel produced a reasonably high gloss, but the setting time of the enamel appeared to be in excess of fifteen minutes and the paint flowed downward by its own weight to produce a sagging or rippling effect on the vertical surface to which it was applied.

According to the present invention, high gloss solvent resin water-in-oil coating compositions have been prepared through the use of a blend of solvents with from about 45% to about 67% of the solvents having a boiling range of from 100° to 300° F. and with from about 30% to about 45% of the solvents having a boiling range of from 300° to 400° F.

Solvents which are contemplated by and have been found useful in the present invention include aliphatic and aromatic hydrocarbons, esters, ketones, glycol ethers and alcohols having the appropriate boiling ranges.

EXAMPLES OF THE PREFERRED GLOSS COATING COMPOSITIONS OF THE PRESENT INVENTION

I. Black Enamel

| | |
|---|---|
| Vinyl toluene and acrylic modified alkyd resin | 15.2% |
| Carbon black | 1.1% |
| Aromatic and aliphatic hydrocarbon solvents, boiling range 200°-300° F. | 33.2% |
| Aromatic hydrocarbon solvent, (SC-100) boiling range 311°-344° F. | 19.5% |
| Pigment dispersants, anti-settling agents, mar resistance agents and drier catalysts | 0.6% |
| Emulsifiers: Sorbitan trioleate (HLB 1.8) | 0.32% |
| Polyethylene glycol monooleate (HLB 8.0) | 0.08% |
| Water | 30.0% |
| | 100.00% |
| Solvent blend composition: | |
| Boiling range -   200°-300° F. | 63.0% |
|                  311°-344° F. | 37.0% |

SC-100 is a known naphtha mixture containing 98% aromatic material of $C_8$ or higher. Aliphatic naphthas of like boiling ranges may be used and are intended as equivalent.

The composition was prepared by first combining the pigment, pigment dispersant, anti-settling agent and a portion of the resin and solvent blend in a mixing vessel as is known in the art. The mixing was continued until the pigment was dispersed to a suitable degree of fineness. Thereafter, the remaining resin and solvent blend was added along with the mar resistance agent and drier catalyst. When the mixing was completed, the oil dispersable emulsifier, HLB 1.8, was stirred into the enamel with a homogenizer-type intensive mixer. After five minutes of mixing, a solution of water and the water dispersable emulsifier, HLB 8.0 is poured into the enamel while under constant mixing. These two emulsifiers, as hereinbefore described, yielded a total emulsifier system value of $80\% \times 1.8 + 20\% \times 8.0 = 3.04$. The water-in-oil emulsion was formed within five to ten minutes.

When combined with a propane or propane/butane/isobutane propellant in an aerosol container and applied to a workpiece, this composition advantageously dried tack-free in fifteen minutes to produce a sag-free film having a gloss of seventy units on a vertical surface.

It was found that while a high gloss was obtained with the above composition, variations in gloss may result from variations in the film thickness due to differences in the amount of solvent to be evaporated. For example, when a vertical test panel was sprayed, the increased film thickness at the left and right edges resulting from the typical back and forth spraying movements dried with a slight haze due to the fact that the film closed before the increased water content could evaporate therefrom. Subsequently, the same composition was prepared, but 3.3% diethylene glycol ethyl ether acetate, based on the total solvent blend, was substituted for part of the low boiling point solvents.

II. Black Enamel

| | |
|---|---|
| Vinyl Toluene and Acrylic modified alkyd resin | 19.7% |
| Carbon black | 1.4% |
| VM & P Naphtha | 21.1% |
| Toluol | 8.1% |
| Aromatic solvent, (SC-100) boiling range 311°-344° F. | 18.0% |
| Diethylene glycol ethyl ether acetate | 1.6% |
| Drier catalysts | 0.1% |
| Anti-settling agent | 0.4% |
| Mar resistance agent | 0.1% |
| Pigment dispersant | 0.2% |
| Ethylene glycol distearate (Emerest 2355, HLB 1.2) | 0.34% |
| Polyethylene oxide tristearate (Liposorb TS-20, HLB 10.5) | 0.06% |
| Water | 28.9% |
| | 100.00% |
| Solvent blend composition: | |
| Boiling range -   200°-300° F. | 59.7% |
|                  311°-344° F. | 37.0% |
|                  417°-430° F. | 3.3% |

The inclusion in the solvent blend of from about 3.0% to about 10.0% of diethylene glycol ethyl ether acetate, isophorone or other ketones, esters or aromatic solvents which have a boiling range of from 350°-500° F. and which are strong solvents for the resin, has been found to keep the film open until the water at the thicker portion of the film has evaporated to produce a gloss coating regardless of the film thickness.

III. Clear Varnish

| | |
|---|---|
| Acrylic modified alkyd resin | 14.1% |

-continued

| | |
|---|---|
| VM & P Naphtha, boiling range 200°-300° F. | 33.1% |
| Aromatic solvent, (SC-100) boiling range 311°-344° F. | 20.3% |
| Isophorone, boiling range 417°-430° F. | 1.8% |
| Mar resistance agent | 0.1% |
| Sorbitan trioleate (Span 85, HLB 1.8) | 0.33% |
| Polyethylene glycol monooleate (Mapeg 200 MO, HLB 8.0) | 0.07% |
| Water | 30.2% |
| | 100.00% |
| Solvent blend composition: | |
| Boiling range - 200°-300° F. | 59.9% |
| 311°-344° F. | 36.8% |
| 417°-430° F. | 3.3% |

IV. White Enamel

| | |
|---|---|
| Vinyl Toluene modified alkyd resin | 16.1% |
| Titanium dioxide | 12.2% |
| Hexane | 1.4% |
| VM & P Naphtha | 22.7% |
| Aromatic solvent, (SC-100) boiling range 311°-344° F. | 14.8% |
| Diethylene glycol ethyl ether acetate | 1.2% |
| Anti-settling agent | 0.4% |
| Mar resistance agent | 0.1% |
| Drier catalysts | 0.1% |
| Pigment dispersant | 0.2% |
| Sorbitan Tristearate (Liposorb TS, HLB 2.1) | 0.31% |
| Polyethylene glycol 200 dilaurate (Emerest 2622, HLB 6.2) | 0.09% |
| Water | 30.4% |
| | 100.00% |
| Solvent blend composition: | |
| Boiling range - 100°-300° F. | 60.1% |
| 311°-344° F. | 36.9% |
| 417°-430° F. | 3.0% |

V. Red Enamel

| | |
|---|---|
| Aromatic hydrocarbon resin (Coumarone-indene resin) | 15.3% |
| Vinyl toluene modified alkyd resin | 1.5% |
| Toluidine toner | 2.2% |
| Yellow Iron Oxide | 0.5% |
| Titanium dioxide | 0.2% |
| Toluol | 28.6% |
| Aromatic solvent, boiling range 311°-344° F. | 17.6% |
| Diethylene glycol ethyl ether acetate | 1.5% |
| Anti-settling agent | 1.0% |
| Mar resistance agent | 0.1% |
| Pigment dispersant | 0.4% |
| Sorbitan sesquioleate (Liposorb SQO HLB 3.7) | 0.3% |
| Diethylene glycol fatty acid ester (Emcol DP50, HLB 5.1) | 0.1% |
| Water | 30.3% |
| | 100.00% |
| Solvent blend composition: | |
| Boiling range - 200°-300° F. | 60.0% |
| 311°-344° F. | 36.1% |
| 417°-430° F. | 3.1% |

Close examination of the black enamel coatings, produced as hereinbefore described, show a tendency of the film to form with blemishes on the surface, apparently due to the coalescence of the water into relatively large droplets which remain occluded in the film after the finely dispersed water has evaporated. These droplets, due to their mass, evaporate at a substantially slower rate than the dispersed water and upon breaking the partially formed film leave small but noticeable craters. By the inclusion of an effective amount of colloidal hydrated aluminum silicate or derivatives thereof, this coalescence is prevented and the water evaporates from the wet enamel without disrupting the normal formation of the high gloss enamel film. This material, added in the form of bentonite or kaolin clay, by its polar nature, assists in holding the water in an emulsified form after the composition is applied and while the film is forming on the workpiece.

VI. Solvent Resin Emulsion Gloss Coating Composition Containing Colloidal Hydrated Aluminum Silicate

| | |
|---|---|
| Carbon black | 1.4% |
| Styrene modified alkyd resin | 11.65% |
| Aromatic hydrocarbon resin (alpha-methylstyrene) | 6.7% |
| VM & P Naphtha | 21.2% |
| Toluol | 8.1% |
| Aromatic solvent, boiling range 311°-344° F. | 18.0% |
| Diethylene glycol ethyl ether acetate | 1.6% |
| Colloidal hydrated aluminum silicate | 0.15% |
| Drier catalyst | 0.1% |
| Anti-settling agent | 0.2% |
| Mar resistance agent | 0.1% |
| Pigment dispersant | 0.1% |
| Sorbitan trioleate (Span 85, HLB 1.8) | 0.32% |
| Polyethylene glycol monooleate (Mapeg 200 MO, HLB 8.0) | 0.08% |
| Water | 30.3% |
| | 100.00% |
| Solvent blend composition: | |
| Boiling range - 200°-300° F. | 59.9% |
| 311°-344° F. | 36.8% |
| 417°-430° F. | 3.3% |

The upper limit on the effective amount of colloidal hydrated aluminum silicate has been found to be limited only by the adverse physical effect of the additive on the formation of a gloss film, generally about 3.0%.

Each of the described compositions of Examples I through VI, whether applied by a brush compressed air spraying apparatus, or sprayed from an aerosol container, provided a high gloss sag-free coating heretofore unobtainable in a water containing paint.

In addition, the compositions of the present invention may incorporate the resins, solvents, emulsifiers and other ingredients identified in the water-in-oil emulsion coating compositions identified in the co-pending patent application of Gus W. Leep and Morris J. Root entitled, "Coating Composition" and filed on June 11, 1981 and having Ser. No. 272,784, the specification of which is incorporated by reference herein.

From the foregoing description, one skilled in the art can easily ascertain the essential characteristics of the invention, and without departing from the spirit and scope thereof, can make various changes and modifications to adapt the invention to various usages and conditions.

The invention is claimed as follows:

1. An improved gloss coating composition, said coating composition being a water-in-oil emulsion, said coating composition comprising: (a) a continuous phase, said continuous phase including at least two evaporable organic solvents, from about 45% to about 67% of a first solvent having a boiling range of from 100° to 300° F., from about 30% to about 45% of a second solvent having a boiling range of from 300° to 400° F., said solvents being of aliphatic or aromatic or combined aliphatic and aromatic hydrocarbon composition; (b) a dispersed phase, said dispersed phase including water; (c) a film-forming resin dissolvable in said solvents, said continuous phase further including an effective amount of said resin for forming a substantially sag-free film on a workpiece, said film registering a gloss value of no less than sixty units when applied to a non-horizontal surface of said workpiece; and (d) an emulsifier, said gloss coating composition including an effective amount of said emulsifier for maintaining homogeneity of said dispersed phase throughout said continuous phase, said emulsifier having an HLB value of from 2 to about 6, said gloss coating composition having as much as 80% water, said gloss coating composition being dryable to form said film on said workpiece, whereupon substantially all of said water and said solvents evaporate from said coating composition and do not thereby alter substantially said gloss value of said film.

2. The improved gloss coating composition of claim 1 wherein said continuous phase includes at least three evaporable solvents, from about 45% to about 67% of a first solvent having a boiling range of from 100° to 300° F., from about 30% to about 45% of a second solvent having a boiling range of from 300° to 400° F., from about 3% to about 10% of a third solvent having a boiling range of from 350° to 500° F.

3. The improved gloss coating composition of claim 1 or claim 2 wherein said emulsifier is an emulsifier system including at least two emulsifying components, a first emulsifying component having an HLB value of from ½ to 5, a second emulsifying component having an HLB value of from 5 to 12, an HLB value for said emulsifier system being a weighted average of said respective HLB values of said first and said second emulsifying components, said emulsifier system having an HLB value of from 2 to about 6.

4. The improved gloss coating composition of claim 2 further including a plurality of substantially non-polar pigment particles, an effective amount of a pigment particle dispersant for dispersion of said pigment particles throughout said coating composition and from about 0.15% to about 3.0% of a colloidal hydrated aluminum silicate for preventing said water from coalescing.

5. The improved gloss coating composition of claim 4 wherein said resin is selected from the group consisting of vinyl toluene modified alkyd resin, acrylic modified alkyd resin, styrene modified alkyd resin, aromatic hydrocarbon resin and mixtures thereof.

6. The improved gloss coating composition of claim 5 wherein said organic solvents are selected from the group consisting of esters, ketones, glycol ethers, alcohols and mixtures thereof.

7. The improved gloss coating composition of claim 6 wherein said coating composition ranges from about 28% to about 51% water.

8. The improved gloss coating composition of claim 6 wherein said coating composition ranges from about 28% to about 31% water.

9. A method of manufacturing an improved gloss coating composition, said coating composition being a water-in-oil emulsion, said coating composition having a continuous phase and a dispersed phase, said continuous phase including at least two evaporable organic solvents, said dispersed phase including water, said gloss coating composition including an effective amount of an emulsifier for maintaining homogeneity of said dispersed phase throughout said continuous phase, said method comprising: (a) blending together from about 45% to about 67% of a first solvent having a boiling range of from 100° to 300° F. and from about 30% to about 45% of a second solvent having a boiling range of from 300° to 400° F. thereby producing a solvent blend, said solvents being of aliphatic or aromatic or combined aliphatic and aromatic hydrocarbon composition; (b) adding to said solvent blend an effective amount of a film-forming resin thereby producing a mixture, said resin being soluble in said solvent blend; and (c) adding to said mixture a first effective amount of said emulsifier and to said dispersed phase a second effective amount of said emulsifier for maintaining homogeneity of said dispersed phase throughout said continuous phase and thereafter mixing said dispersed phase and said mixture thereby producing said water-to-oil emulsion capable of forming a substantially sag-free film on a workpiece, said film registering a gloss value of no less than sixty units when applied to a non-horizontal surface of said workpiece, said emulsifier having an HLB value of from 2 to about 6, said gloss coating composition having as much as 80% water, said gloss coating composition being dryable to form said film on said workpiece, whereupon substantially all of said water and said solvents evaporate from said coating composition and do not thereby alter substantially said gloss value of said film.

10. The method of claim 9 wherein said continuous phase includes at least three evaporable solvents and the blending step includes blending together from about 45% to about 67% of said first solvent, from about 30% to about 45% of said second solvent and from about 3% to about 10% of a third solvent having a boiling range of from 350° to about 500° F. thereby producing said solvent blend.

11. The method of claim 9 or claim 10 wherein said emulsifier is an emulsifier system including at least two emulsifying components, a first emulsifying component having an HLB value of from ½ to 5, a second emulsifying component having an HLB value of from 5 to 12, an HLB value for said emulsifier system having a weighted average of said respective HLB values of said first and said second emulsifying components, said emulsifier system having an HLB value of from 2 to about 6.

12. The method of claim 10 including the step of further adding to said mixture a plurality of substantially non-polar pigment particles, an effective amount of a pigment particle dispersant for dispersion of said pigment particles throughout said coating composition and from about 0.15% to about 3.0% of a colloidal hydrated aluminum silicate for preventing said water from coalescing.

13. The method of claim 12 wherein said resin is selected from the group consisting of vinyl toluene modified alkyd resin, acrylic modified alkyd resin, styrene modified alkyd resin, aromatic hydrocarbon resin and mixtures thereof.

14. The method of claim 13 wherein said organic solvents are selected from the group consisting of esters, ketones, glycol ethers, alcohols and mixtures thereof.

15. The method of claim 14 wherein said coating composition ranges from about 28% to about 51% water.

16. The method of claim 14 wherein said coating composition ranges from about 28% to about 31% water.

17. The method of claim 14 further including the step of adding into an aerosol container said gloss coating composition and an effective amount of an aerosol propellant for propelling said gloss coating composition therefrom.

* * * * *

UNITED STATES PATENT AND TRADEMARK OFFICE
CERTIFICATE OF CORRECTION

PATENT NO. : 4,362,838

DATED : December 7, 1982

INVENTOR(S) : GUS W. LEEP AND GARY L. BOLT

It is certified that error appears in the above-identified patent and that said Letters Patent is hereby corrected as shown below:

Column 8, line 21, change "water-to-oil" to --water-in-oil--;

Column 8, line 45, change "having a weighted average" to --being a weighted average--.

Signed and Sealed this

Twenty-second Day of March 1983

[SEAL]

Attest:

GERALD J. MOSSINGHOFF

Attesting Officer

Commissioner of Patents and Trademarks